Jan. 12, 1937.     J. F. KELLER     2,067,272
MOUNTING FOR EYEGLASSES AND SPECTACLES
Filed May 10, 1935

INVENTOR.
Joseph F. Keller
BY
ATTORNEY

Patented Jan. 12, 1937

2,067,272

UNITED STATES PATENT OFFICE 2,067,272

MOUNTING FOR EYEGLASSES AND SPECTACLES

Joseph F. Keller, New York, N. Y.

Application May 10, 1935, Serial No. 20,726

2 Claims. (Cl. 88—47)

The object of the present invention is to provide a mounting for eyeglasses and spectacles so formed that upon insertion and rotation of a lens-holding screw the lens will be clamped and firmly held simultaneously with clamping action upon the screw by the holding ears to which the screw is applied. The screws may be applied either to the ears of a bridge piece of a spectacle frame which holds the lenses either in co-action with a bridge piece or independently of the bridge piece.

The invention will be described with reference to the accompanying drawing, in which:—

Figure 1:
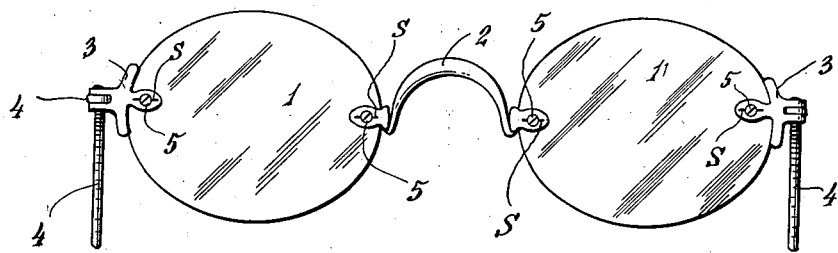
Figure 1 is a view in front elevation of a spectacle constructed in accordance with the invention.
Figure 2:
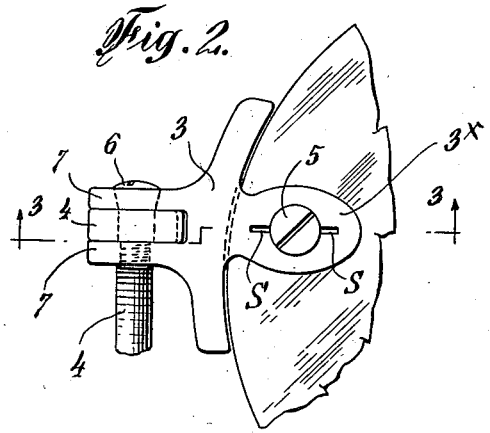
Figure 2 is an enlarged fragmentary front elevation of one of the lens structures and a mounting therefor.
Figure 3:
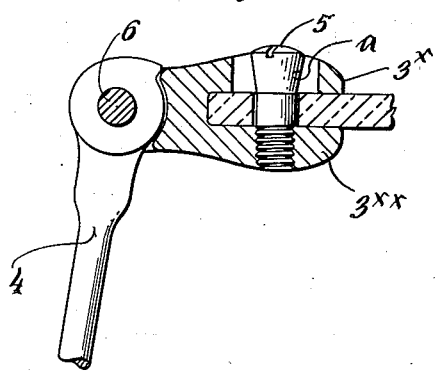
Figure 3 is a horizontal section on the line 3—3, Fig. 2, looking in the direction of the arrow.
Figure 4:
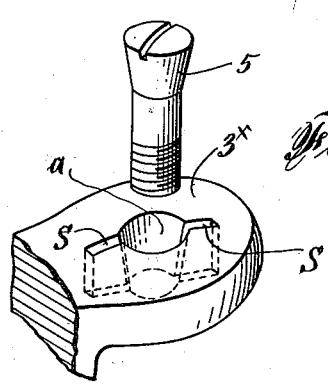
Figure 4 is an enlarged perspective view of the front lens-holding ear and the screw therefor.

Referring to the drawing, I have shown a spectacle construction which comprises the lenses 1, a bridge piece 2, outer lens-holding frames 3 and ear pieces 4.

Each lens-holding frame 3 is formed with spaced projecting ears $3x$, $3xx$, and springy, resilient metal is employed at this point of the construction. Ear $3x$ is formed with a centrally disposed tapered aperture $a$ and the aperture merges with a slot $s$ which extends at opposite sides of the tapered aperture. The effect is a split ear having a central tapered screw-receiving area. Ear $3xx$ is formed with a threaded aperture to receive the threaded stem of the screw. The screw 5 has a tapered head and a threaded stem.

In practice the tapered aperture $a$ will be of less cross-sectional area than that of the tapered screw head. Thus, as the screw is threaded into ear $3xx$, the springy metal of ear $3x$, opposite the slots $s$ will be sprung and exert a clamping hold upon the head of the screw simultaneously with a movement toward each other of the ears to cause their clamping action upon the lens. If desired, slot $s$ may extend through the end of ear $3x$ although in usual practice, this will be unnecessary.

When frames 3 and ear pieces 4 are used, the latter may be secured to the frame by pivot screws 6 in the usual manner, the ear pieces being mounted between ears 7, member 3. In the latter case, also, screw 6 may have a tapered head and ear 7 may be formed with a slot or slots equivalent to those in the lens-holding members.

By the construction, the lens-holding screws 5 are clamped firmly in position without any additional part whatsoever, and the tension of the metal at opposite sides of the screw head is utilized for the clamping action to resist rotation of the screw during the use of the eyeglasses or spectacles.

Having described my invention, what I claim and desire to secure by Letters Patent, is as follows:

1. A mounting for eyeglasses and spectacles comprising a frame member formed with opposed ears of springy material, the ears being adapted to receive a member of the structure between them, a screw passing through said member and having a tapered head, a tapered aperture formed in one of the ears and of less diameter than that of the tapered head of the screw, the walls of said aperture having a smooth surface merging with a split section of the ear, the second ear being formed with a threaded aperture to receive the threaded section of the screw, whereby rotation of the screw when in position will exert a constantly maintained and progressively increasing spring-yielding action upon opposite metallic areas on the first-named ear to exert a clamping action upon the head of the screw.

2. A mounting for eyeglasses and the like, comprising a frame member formed with opposed ears of springy material, the ears being adapted to receive a member of the structure between them, a screw passing through said member and having a head formed with a taper of less than 15°, a tapered aperture formed in one of the ears and of less diameter than that of the tapered head of the screw and less than 15°, the walls of said aperture having a smooth surface merging with a split section of the ear, the second ear being formed with a threaded aperture to receive the threaded section of the screw, whereby rotation of the screw when in position will exert a primary constantly maintained and progressively increasing spring yielding action upon opposite metallic areas of the first-named ear to exert a clamping action upon the head of the screw.

JOSEPH F. KELLER.